(12) United States Patent
He et al.

(10) Patent No.: US 8,768,082 B2
(45) Date of Patent: Jul. 1, 2014

(54) COMPRESSING IMAGE DATA

(75) Inventors: Dake He, Waterloo (CA); Xiang Yu, Kitchener (CA); Jing Wang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 224 days.

(21) Appl. No.: 13/166,423

(22) Filed: Jun. 22, 2011

(65) Prior Publication Data

US 2012/0328204 A1 Dec. 27, 2012

(51) Int. Cl.
*G06K 9/36* (2006.01)

(52) U.S. Cl.
USPC ........................................................ 382/238

(58) Field of Classification Search
CPC G06T 1/20; G06T 2207/10016; H04N 19/00; H04N 19/009; H04N 19/00012; H04N 19/0018; H04N 19/00036; H04N 19/00042; H04N 19/00109; H04N 19/00127; H04N 19/00133; H04N 19/00157; H04N 19/00169; H04N 19/00175; H04N 19/00181; H04N 19/0021; H04N 19/00266; H04N 19/00272; H04N 19/00278; H04N 19/00296; H04N 19/00309; H04N 19/0043; H04N 19/00436; H04N 19/00448; H04N 19/00466; H04N 19/00478; H04N 19/00533; H04N 19/00545; H04N 19/00563; H04N 19/00587; H04N 19/0063; H04N 19/00672; H04N 19/00678; H04N 19/00684; H04N 19/0069; H04N 19/00696; H04N 19/00703; H04N 19/00715; H04N 19/00721; H04N 19/00751; H04N 19/00757; H04N 19/00763; H04N 19/0078; H04N 19/00787; H04N 19/00818; H04N 19/00842; H04N 19/0086; H04N 19/00884; H04N 19/0089; H04N 19/00903; H04N 19/00909; H04N 19/00933; H04N 19/00939; H04N 19/00945; H04N 19/00951; H04N 19/00969

USPC ............ 382/232–233, 236, 238; 375/240.01, 375/240.12, 240.16, 240.18, 240.24; 348/394.1–395.1, 400.1–403.1, 348/409.1–416.1, 420.1–421.1, 348/430.1–431.1

See application file for complete search history.

(56) References Cited

U.S. PATENT DOCUMENTS 6,590,936 B1 7/2003 Kadono
7,233,269 B1 6/2007 Chen et al.

(Continued)

FOREIGN PATENT DOCUMENTS

WO WO2011050641 A1 5/2011

OTHER PUBLICATIONS

Wikipedia, *H.264/MPEG-4 AVC*, http://en.wikipedia.org/wiki/H.264/MPEG-4_AVC, dated Jun. 17, 2011, 16 pages.

(Continued)

*Primary Examiner* — Jose Couso

(74) *Attorney, Agent, or Firm* — Fish & Richardson P.C.

(57) ABSTRACT

Methods, systems, and computer programs for encoding and decoding image are described. In some aspects, an input data block and a prediction data block are accessed. A projection factor is generated based on a projection of the input data block onto the prediction data block. A scaled prediction data block is generated by multiplying the projection factor by the prediction data block. A residual data block is generated based on a difference between the input data block and the scaled prediction data block. In some aspects, a prediction data block, a residual data block, and a projection factor associated with the residual data block are accessed. A scaled prediction data block is generated by multiplying the projection factor by the prediction data block. An output data block is generated by summing the residual data block and the scaled prediction data block.

24 Claims, 6 Drawing Sheets

(56) References Cited

U.S. PATENT DOCUMENTS

| | | | |
|---|---|---|---|
| 7,496,236 B2 * | 2/2009 | Fogg | 382/233 |
| 7,499,492 B1 | 3/2009 | Ameres et al. | |
| 8,094,711 B2 * | 1/2012 | Tourapis et al. | 375/240.01 |
| 8,107,535 B2 * | 1/2012 | Woods et al. | 375/240.16 |
| 8,135,234 B2 * | 3/2012 | Tourapis et al. | 382/275 |
| 8,391,363 B2 * | 3/2013 | Wu et al. | 375/240.16 |
| 2004/0008782 A1 | 1/2004 | Boyce et al. | |
| 2006/0215762 A1 | 9/2006 | Han et al. | |
| 2006/0251330 A1 | 11/2006 | Toth et al. | |
| 2007/0104272 A1 | 5/2007 | He et al. | |
| 2008/0165860 A1 | 7/2008 | Sahraoui et al. | |
| 2009/0122868 A1 | 5/2009 | Chen et al. | |
| 2009/0225830 A1 | 9/2009 | He et al. | |
| 2010/0278230 A1 | 11/2010 | MacInnis et al. | |

OTHER PUBLICATIONS

H.264, ITU-T, Telecommunication Standardization Sector of ITU, dated Mar. 2010, 676 pages.

Wiegand, T., et al., WD3: Working Draft 3 of High-Efficiency Video Coding, Joint Collaborative Team on Video Coding (JCT-VC) of ITU-T SG16 WP3 and ISO/IEC JTC1/SC29/WG11, Mar. 2011, 205 pages.

International Search Report and Written Opinion of the International Searching Authority issued in International Application No. PCT/CA2011/050384 on Mar. 6, 2012; 9 pages.

International Search Report and Written Opinion of the International Searching Authority issued in International Application No. PCT/CA2011/050383 on Mar. 22, 2012; 9 pages.

Office Action issued in U.S. Appl. No. 13/166,428 on Aug. 2, 2013, 17 pages.

International Preliminary Report on Patentability under Chapter I issued in International Application No. PCT/CA2011/050383 on Jan. 9, 2014; 7 pages.

International Preliminary Report on Patentability under Chapter I issued in International Application No. PCT/CA2011/050384 on Jan. 9, 2014; 7 pages.

Office Action issued in U.S. Appl. No. 13/166,428 on Dec. 26, 2013, 22 pages.

* cited by examiner

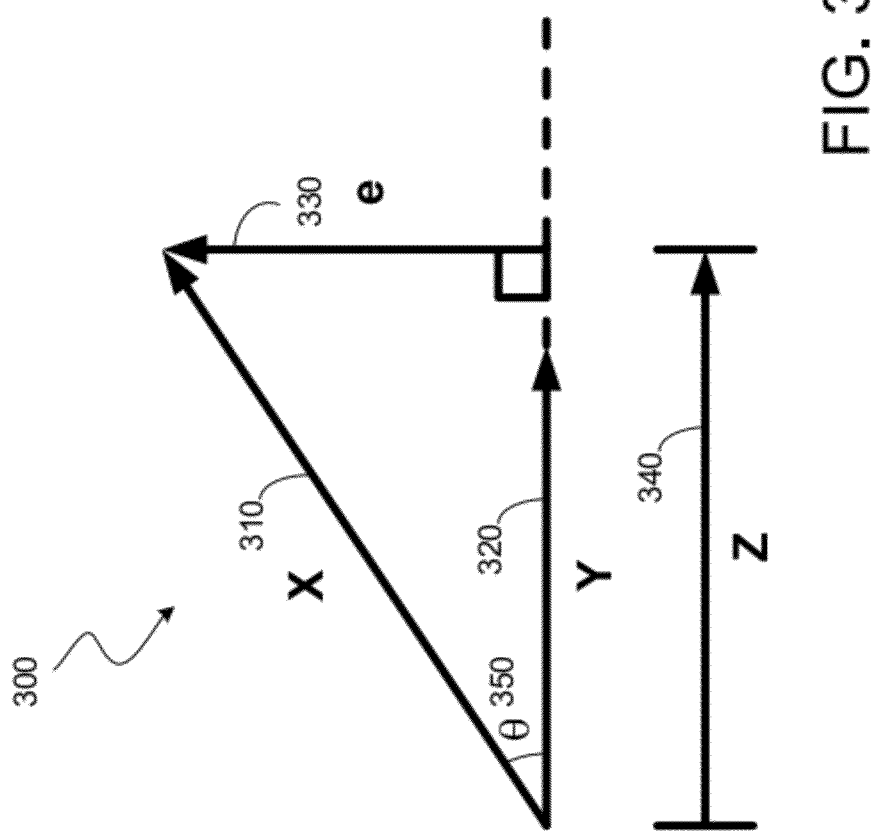

COMPRESSING IMAGE DATA

BACKGROUND

This specification relates to data compression techniques for encoding and decoding image data. Image data can be encoded and decoded by a number of different techniques that use block-based coding processes. One example technique is the H.264 video compression standard. In such processes, an image or a frame of a video is divided into blocks and the blocks are spectrally transformed into coefficients, quantized, and entropy encoded. In some cases, the data being transformed are not the actual pixel data, but are residual data following a prediction operation. The predictions can be intra-frame, i.e. block-to-block within the frame/image, or inter-frame, i.e. between frames (also called motion prediction).

BRIEF DESCRIPTION OF THE DRAWINGS

FIG. 3 is a vector representation of example data blocks.

Like reference numbers and designations in the various drawings indicate like elements.

DETAILED DESCRIPTION

Figure 1:
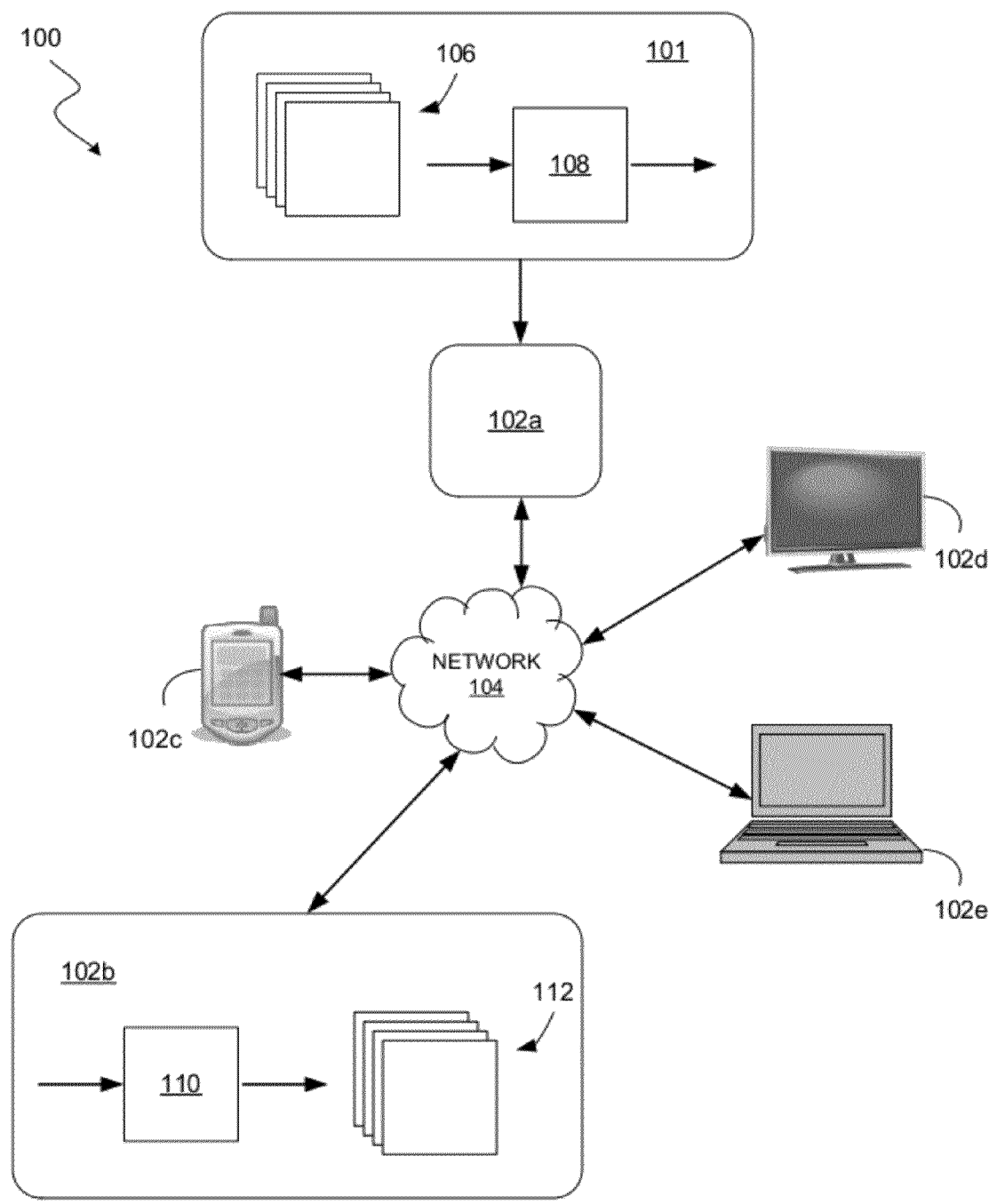
FIG. 1 is a schematic diagram showing aspects of an example data communication system.

A block-based coding technique can be used for encoding and decoding image data. In some implementations, the image data can include a still picture, a video, a multimedia graphic, a vector graphic, a raster graphic, or any suitable combination of these and other types of image data. As an example, block-based coding techniques can be used to compress a sequence of frames (or pictures) of a video. In some implementations, each frame or picture is divided into blocks (e.g., 4×4, 8×8, 16×16, 32×32, 64×64, etc.) of pixel data, and the blocks within each frame are coded in order (e.g., raster order). According to some example encoding techniques, a residual block is derived from each input block, and the residual block is transformed, quantized, and entropy encoded. Given the entropy-encoded data blocks generated by an encoder, the video frames can be generated by a decoding technique. For example, a decoder may entropy decode, de-quantize, and inverse transform each block generated by the encoder, and the decoder may combine the each resulting residual data blocks with a corresponding prediction blocks to produce output data blocks.

In some implementations, a scaled reference block can be used to improve the efficiency of a compression scheme. For example, the reference block can be scaled by a projection factor, and the residue can be derived from the scaled reference block. The projection factor can be calculated based on a formula that ensures the scaled reference block is orthogonal, or close to orthogonal, to the residual data block, which may improve compression efficiency. In some cases, the energy of the residual data block is lower when the residual data block is orthogonal to the reference data block, and the lower energy of the residual data block may lead to less information loss during quantization or other operations, higher compression efficiency, or other advantages in certain cases.

In some implementations, to encode a current block of pixels, a reference block is derived based on a block that was already coded according to the coding order. The reference block can be derived from a different frame or picture (called "inter prediction") or from the same frame or picture (called "intra prediction"). The residual block can be generated by scaling the reference block by a projection factor, and then subtracting the scaled reference block from the current block. The reference block can be scaled, for example, by multiplying the reference block by the projection factor. In some implementations, the projection factor can be calculated based on a projection of the current block onto the reference block. Each residual block can be transformed to a block of transform coefficients, the transform coefficients can be quantized, and the quantized transform coefficients can be entropy-encoded to form a bitstream. The projection factor can be encoded by the same or a similar technique.

In some implementations, the output of the encoding procedure can be decoded using an inverse procedure. For example, the image data can be decoded by entropy-decoding the bitstream, de-quantizing the entropy-decoded data, and inverse transforming the entropy-decoded data to recover the residual block. The projection factor can be recovered by the same or a similar technique. The scaled reference block that was used to generate the residual block at the encoder can also be recovered at the decoder using previously decoded data multiplied by the decoded projection factor. The current block can then be reconstructed, for example, by adding the residual block to the scaled reference block.

FIG. 1 shows an example system 100 for communicating data, including graphic, video, media, or other image data, between one or more nodes 101, 102a-102e communicably coupled over a network 104. In this example, a node 101 receives a sequence of frames 106 from one or more sources (not shown) such as a video camera or a video stored in a storage medium, or any other source that can detect, derive, capture, store or record visual information such as video or images. The frames 106 may also be referred to as pictures in some contexts. In some implementations, the sources may be in communication with the node 101, or may be a part of the node 101. The node 101 includes an encoder module 108 that encodes the frames 106 to generate a stream or file of encoded video data. In this example, the encoded video data is provided to a node 102a coupled to the network 104. Alternatively, the node 101 may itself be coupled to the network 104, or the encoded video data may also or alternatively be stored locally for later transmission or output, such as in a non-volatile memory or other storage medium.

The node 102a can transmit the encoded video data (e.g., as a stream or a file) to any of a variety of other nodes 102b-102e (e.g., a mobile device, a television, a computer, etc.) coupled to the network 104. The node 102a can include a transmitter configured to optionally perform additional encoding (e.g., channel coding such as forward error-correction coding) and to modulate the data onto signals to be transmitted over the network 104. The node 102b can receive and demodulate the signals from the network 104 to recover the encoded video data. The node 102b includes a decoder module 110 that decodes the encoded video data and generates a sequence of reconstructed frames 112. In some implementations, the node 102b may include a display for rendering the reconstructed frames 112. The node 102b may include a storage medium to store the encoded video data for later decoding including at a time when the node 102b is not coupled to the network 104.

The network 104 may include any number of networks interconnected with each other. The network 104 may include any type and/or form of network(s) including any of the following: a wide area network (such as the Internet), a local area network, a telecommunications network, a data communication network, a computer network, a wireless network, a wireline network, a point-to-point network, and a broadcast network. The network may include any number of repeaters, appliances, devices, servers, storage media and queues.

In the description that follows, example implementations are described with reference to two-dimensional video coding/decoding. However, these techniques may also be applicable to coding/decoding techniques for other types of image data. For example, the techniques described below can be adapted for coding/decoding still pictures, graphics, or video data that include additional views or dimensions, including multiview video coding (MVC) and three-dimensional (3D) video, extensions of video coding/decoding schemes such as scalable video coding (SVC), and other media coding/decoding schemes that use entropy coding/decoding with different contexts associated with different portions of the data. For example, for any suitable type of residual data predicted from reference data, the techniques for determining a reference data dependent context for entropy coding/decoding of a portion of the residual data can be applied for a variety of different uses of the context in the entropy coding process.

In the description that follows, the terms picture, frame and slice are used somewhat interchangeably. For example, in the case of the H.264 standard, a picture or a frame may contain one or more slices. Moreover, certain encoding/decoding operations can be performed on a frame-by-frame basis and some can be performed on a slice-by-slice basis. As such, some aspects of an encoding/decoding process in particular implementations may be selected based on requirements of an applicable video coding standard or scheme, system requirements, or other factors. For example, the applicable video coding standard may determine whether the operations described below are performed in connection with frames, pictures or slices, as the case may be.

Figure 2A:
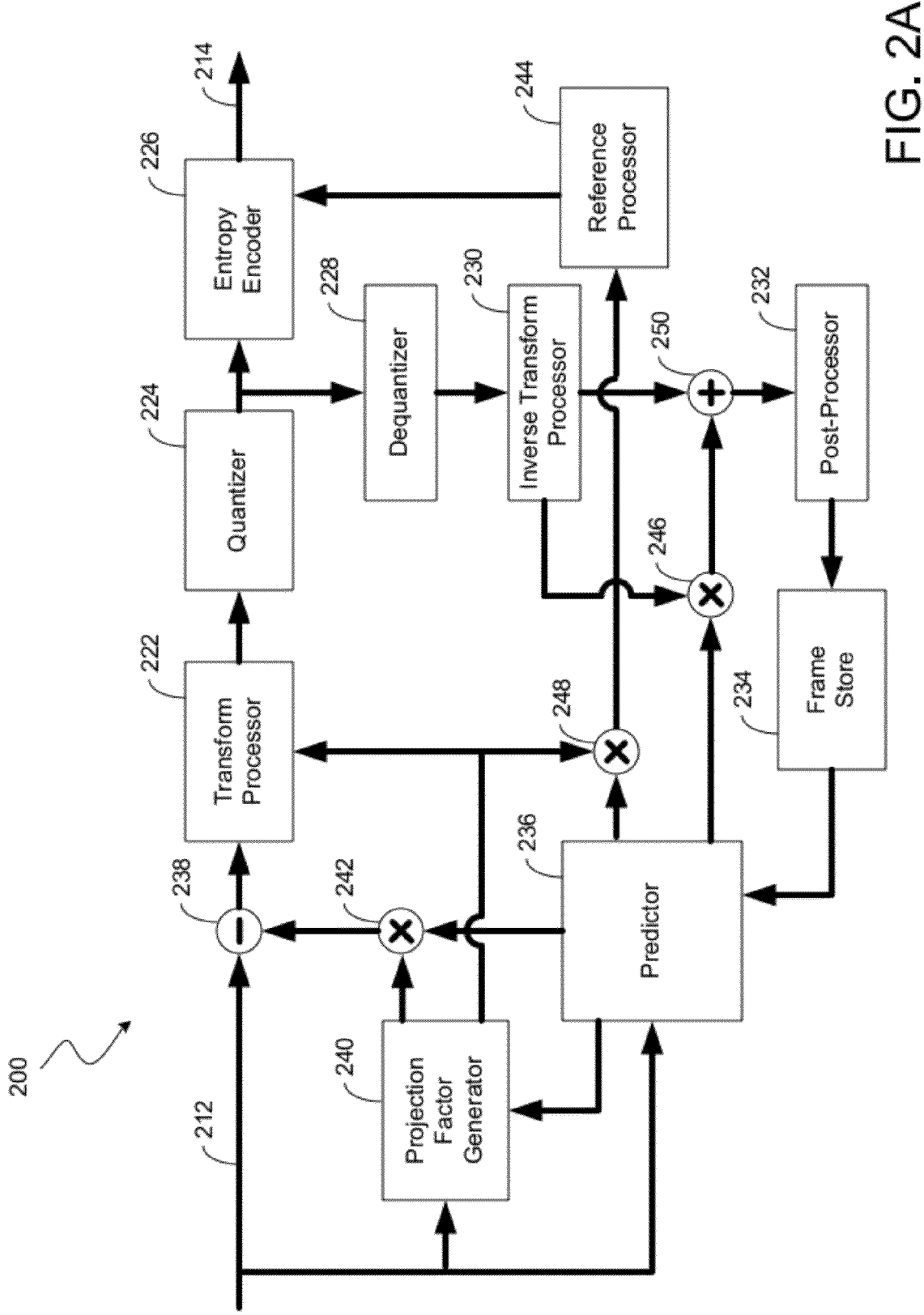
FIG. 2A is a schematic diagram showing aspects of example video encoder.
Figure 2B:
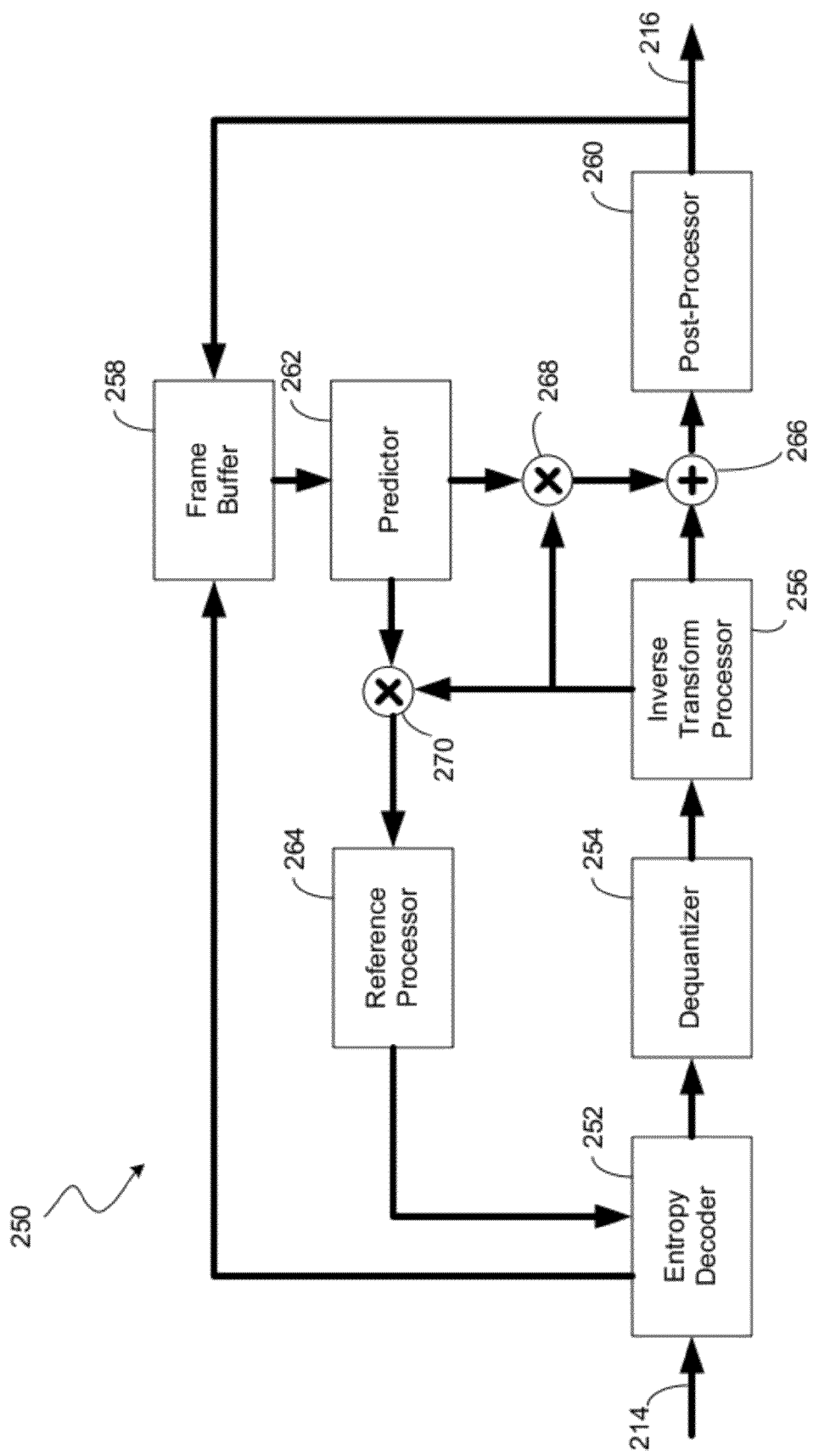
FIG. 2B is a schematic diagram showing aspects of example video decoder.

FIG. 2A is a schematic diagram showing aspects of example video encoder 200, and FIG. 2B is a schematic diagram showing aspects of example video decoder 250. The encoder 200 and decoder 250 may each be implemented on an application-specific or general purpose computing device, containing one or more processing elements and memory. The operations performed by the encoder 200 or decoder 250, as the case may be, may be implemented by way of application-specific integrated circuit, for example, or by way of stored program instructions executable by a general purpose processor. The device may include additional hardware and software, including, for example, an operating system for controlling basic device functions.

The modules and the interactions among the modules shown schematically in FIGS. 2A and 2B are provided as an example. One or more of the example modules can be combined, divided, or otherwise reconfigured, as may be appropriate in certain contexts. In some implementations, two or more of the modules are combined and implemented as a single module. For example, in some cases the entropy encoder 226 and the quantizer 224 are implemented as a single module. As another example, in some cases the quantizer 224 and one or more aspects of the reference processor module 244 are implemented as a single module. In some implementations, individual modules can be implemented as multiple modules or can be reconfigured to interact with additional or different modules.

The example encoder 200 receives input data 212 from a source (e.g., a video source) and produces an encoded bitstream 214. The example decoder 250 receives the encoded bitstream 214 (as input data for the decoder 250) and outputs a decoded video frame 216. The encoder 200 and decoder 250 may be configured to operate in conformance a video compression standard or scheme.

In FIG. 2A, the example encoder 200 includes a transform processor module 222, a quantizer 224, and an entropy encoder 226. The input data 212 includes frames or pictures of spatial domain data where each frame or picture is organized, for example, as blocks of pixel data, which may further be organized as "macroblocks" or "coding units" that are made up of multiple blocks of pixel data. The blocks of pixel data each include a two-dimensional array of pixel data where each pixel represents a value (e.g., a luminance value that represents an overall intensity, a chrominance value that includes color information, or another type of value). In some implementations, the pixel values define colors in terms of luminance and chrominance components, RGB components, CMYK components, gray scale components, or any suitable components of color representation. As such, the input data 212 can include one or more luminance blocks, one or more chrominance blocks, or a combination of luminance and chrominance blocks. In some implementations, the input data 212 can include other types of blocks.

The example transform processor module 222 can perform a transform upon the spatial domain data. In particular, the transform processor module 222 can apply a block-based transform to convert spatial domain data (in a spatial domain with dimensions x and y) to spectral components in a transform domain (with dimensions $f_x$ and $f_y$ that represent spatial frequencies). For example, in some implementations a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes (e.g., 16×16, 32×32, or 64×64 blocks, or rectangular blocks having different numbers of pixels in the x and y dimensions in the spatial domain, and different numbers of coefficients in the $f_x$ and $f_y$ dimensions in the transform domain).

Applying the block-based transform to a block of pixel data can generate a set of transform domain coefficients. The transform domain coefficients can include an ordered set in which the coefficients have coefficient positions (in the transform domain with dimensions $f_x$ and $f_y$). In some instances the set of transform domain coefficients may be considered a block or matrix of coefficients.

The block of transform domain coefficients can be quantized by the quantizer 224. The quantized coefficients and associated information can be encoded by the entropy encoder 226.

A predictor 236 can provides a reference block for performing prediction. The example predictor 236 includes a module operable to determine the appropriate coding mode, for example, whether the picture, frame, or slice being encoded is of I, P, or B type. Intra-coded frames/slices (i.e., type I) can be encoded without reference to other pictures, frames, or slices (e.g., without temporal prediction). Intra-coded frames can utilize spatial prediction within the picture, frame, or slice.

That is, when encoding a particular block, a prediction may be generated based on pixels within blocks already encoded for that picture, frame, or slice.

A projection factor generator 240 can provide a projection factor for performing prediction. The example projection factor generator 240 includes a module operable to calculate the projection factor using the reference block from the predictor 236 and the current block from the input data 212. The projection factor generator is operable to send the projection factor to the transform processor 222 to be included with the residual block in the encoded bitstream 214. In some implementations, the projection factor generator 240 can operate on transform domain inputs, and provide an output to the quantizer 224.

Using a multiplication processor module 242 (e.g., multiplying the respective values), the pixel data of the reference block can be multiplied by the projection factor to generate a scaled reference block. Using a difference processor module 238 (e.g., subtraction of respective pixel values), the pixel data of the scaled reference block can be subtracted from the pixel data of the current block to generate a block of residual data. The transform processor module 222 can convert the residual data and the projection factor into coefficients in the transform domain. H.264, for example, prescribes nine spatial prediction modes for 4×4 transform blocks, and HEVC prescribes additional spatial prediction modes. In some implementations, multiple of the modes may be used to independently process a block, and rate-distortion optimization can be used to select a particular mode.

The example encoder 200 may take advantage of temporal prediction, for example, based on motion prediction/compensation. Accordingly, the encoder 200 includes a feedback loop that includes a de-quantizer 228 and an inverse transform processor module 230. The encoder 200 includes a multiplication processor module 246 operable to multiply the inverse transformed projection factor with the reference block from the predictor to create the scaled reference block, an addition processor module 249 to sum the inverse transformed residual data block with the scaled reference block, and a post-processor module 232. These elements mirror the decoding process implemented by the decoder 250 to reproduce the picture, frame, or slice. A frame store 234 can store the reproduced frames.

The motion prediction can be based on what will be the reconstructed frames at the decoder 250. For example, the original frames may differ from the reconstructed frames due to any lossy operations in the encoding/decoding process. When performing motion prediction/compensation, the predictor 236 can use the pictures, frames, or slices stored in the frame store 234 as a source for comparison to a current picture, frame, or slice for the purpose of identifying similar blocks. Accordingly, for blocks to which motion prediction is applied, the source data which the transform processor module 222 encodes can include the residual data that comes out of the motion prediction process. For example, it may include information regarding the reference frame or picture, a spatial displacement or motion vector, and residual pixel data that represents the differences (if any) between the scaled reference block and the current block. Information regarding the reference frame and/or motion vector is not necessarily processed by the transform processor module 222 and/or quantizer 224, but instead may be supplied to the entropy encoder 226 for encoding as part of the bitstream along with the quantized coefficients.

The example encoder 200 also includes a reference processor module 244 that can aid the entropy encoder 226 in generating a bitstream 214. The reference processor module 244 may be used to improve compression efficiency. For example, in some implementations, the reference processor module 244 receives the scaled reference block through a multiplication processor module 248. The reference processor module 244 may provide reference information that the entropy encoder 226 uses to categorize different contexts in a context model according to spectral properties of the scaled reference block (e.g., in addition to a spectral position within a transform of the residual block). By providing multiple contexts for a given residual block spectral position, the entropy encoding can be performed more efficiently. For example, in the case of an arithmetic code, the estimated probabilities provided by different contexts can be estimated more accurately by accounting for different characteristics that are evident from the scaled reference block. In the case of a Huffman code, the different sets of codewords (called "codes") provided by different contexts can be selected in a more customized way to account for different characteristics that are evident from the scaled reference block.

As shown in FIG. 2B, the decoder 250 includes an entropy decoder 252, dequantizer 254, an inverse transform processor module 256, and a post-processor module 260. A frame buffer 258 can supply reconstructed frames for use by a predictor 262 in applying spatial prediction and motion compensation. The multiplication processor module 268 represents the operation of creating a reconstructed scaled reference block from multiplying the decoded projection factor from the inverse transform processor module 256 with a previously decoded reference block from the predictor 262. The addition processor module 266 represents the operation of recovering the video data for a particular reconstructed block to be supplied to the post-processor module 260 from the reconstructed scaled reference block from the multiplication processor module 266 and a decoded residual block from the inverse transform processor module 256.

The encoded bitstream 214 can be received and decoded by the entropy decoder 252 to recover the quantized coefficients. The coefficient for the projection factor may be decoded before the coefficient for the residual block is decoded. Side information may also be recovered during the entropy decoding process, some of which may be supplied to the motion compensation loop for use in motion compensation, if applicable. For example, the entropy decoder 252 may recover motion vectors and/or reference frame information for inter-coded macroblocks. In the process of performing entropy decoding, the decoder 250 can also use information from a reference processor module 264 to provide the same reference information that was used in the encoder 200, which may enable the entropy decoder 252 to assign contexts in the same way as the encoder 200, for example, to adaptively estimate the same probabilities that were used to encode symbols in the encoder in the case of arithmetic coding, or to apply the same code in the case of Huffman coding. The reference processor module 264 may be configured in some instances to receive a reference block from the predictor 262 that has been multiplied by a decoded projection factor in multiplication processor module 270.

The quantized coefficients can be de-quantized by the dequantizer 254 to produce the transform domain coefficients, which can be inverse-transformed by the inverse transform processor module 256 to recreate the video data. The decoded projection factor may be de-quantized and inverse transformed, for example, before or after the decoded coefficients for the residual block are de-quantized and inverse transformed. In some cases, such as with an intra-coded macroblock, the recreated video data is the residual data for use in spatial compensation relative to a previously decoded block within the frame or picture that has been multiplied by the decoded, dequantized and inverse transformed projection factor. The decoder 250 generates the video data from the residual data, the projection factor and pixel data from a previously decoded block. In other cases, such as inter-coded macroblocks, the recreated video data from the inverse transform processor module 256 is the residual data for use in motion compensation relative to a reference block from a different frame multiplied by the decoded, de-quantized and inverse transformed projection factor.

In some implementations, when performing motion compensation, the predictor 262 can locate a reference block within the frame buffer 258 specified for a particular inter-coded macroblock. The reference block may be located, for example, based on the reference frame information and motion vector specified for the inter-coded macroblock. The predictor 262 can supply the reference block pixel data to the multiplication processor module 266 to be multiplied with a decoded projection factor for combination with the residual data to arrive at the recreated video data for that macroblock.

Post-processing may then be applied to a reconstructed picture, frame, or slice, as indicated by the post-processor module 260. For example, the post-processing can include de-blocking. In some cases the post-processor module operates in a bypass mode to provide reconstructed data without any post-processing (e.g., de-blocking may not be necessary after spatial compensation). After post-processing, the picture, frame, or slice is output as the decoded video frame 216, for example for display on a display device. A video playback machine, such as a computer, set-top box, DVD or Blu-Ray player, and/or mobile handheld device, may buffer decoded frames in a memory prior to display on an output device.

FIG. 3 is a vector representation 300 of example data blocks. The vector representation 300 is provided for illustration purposes. Each of the vectors in the vector representation 300 can represent one or more aspects of a data block (e.g., a two-dimensional matrix). Vector X 310 represents an input data block, vector Y 320 represents a reference data block and vector e 330 represents a residual block. The angle formed between the vector X 310 and the vector Y 320 is represented by the angle θ 350. Vector Z 340 represents a projection of vector X 310 in the direction of vector Y 320. Vector e 330 is produced from the difference between vector X 310 and vector Z 340 (e=X−Z).

The orthogonal projection of vector X 310 in the direction of vector Y 320 can be described by the relationship |Z|=|X|cos θ, where |Z| is the magnitude of vector Z 340, |X| is the magnitude of vector X 310 and cos θ is the cosine of angle θ 350. The vectors X 310 and Y 320 are related to the cosine of angle θ 350 by the following relationship:

$$\cos\theta = \frac{<X,Y>}{<Y,Y>}.$$

As such, the following relationship may be derived:

$$Z = \frac{<X,Y>}{<Y,Y>}Y.$$

In the above relationship, the dot product of the vectors X 310 and Y 320 are represented by the notation <X,Y> and the dot product of vector Y 320 with itself is represented by the notation <Y,Y>. As a result of the above relationships, the vector Z 340 is related to vector Y 320 through the relationship Z=ρY, where ρ represents a projection factor that is governed by the relationship:

$$\rho = \frac{<X,Y>}{<Y,Y>}.$$

Because of the relationship between vector Z 340 and vector Y 320 through projection factor ρ, the relationship between the residual block vector e 330 is related to vector Z 340, vector X 310 and vector Y 320 through the relationship:

$$e=X-Z=X-\rho Y.$$

The relationship allows for the creation of residual block vectors that are derived from the current block vector and the orthogonally projected vector of the current block in the direction of the reference block, thereby increasing the efficiency of encoding and decoding in some instances. In some implementations, quantization of the residual data block e can be optimized or improved when X−ρY and Y are Gaussian or approximately Gaussian.

The creation of a projection factor ρ and a residual block vector e 330 is illustrated through the following example using example 2×2 data blocks. As an example, the vector X 310 can represent the matrix [$x_{1,1}$, $x_{1,2}$; $x_{2,1}$, $x_{2,2}$] and the reference block vector Y 320 can represent the matrix [$y_{1,1}$, $y_{1,2}$; $y_{2,1}$, $y_{2,2}$]. The projection factor would be derived by:

$$\rho = \frac{<X,Y>}{<Y,Y>} = \frac{(x_{1,1} \times y_{1,1}) + (x_{1,2} \times y_{1,2}) + (x_{2,1} \times y_{2,1}) + (x_{2,2} \times y_{2,2})}{(y_{1,1} \times y_{1,1}) + (y_{1,2} \times y_{1,2}) + (y_{2,1} \times y_{2,1}) + (y_{2,2} \times y_{2,2})}.$$

As a result, the residual block vector e 330 can be derived by:

$$e = X - \rho Y = \begin{bmatrix} x_{1,1} & x_{1,2} \\ x_{2,1} & x_{2,2} \end{bmatrix} - \rho \begin{bmatrix} y_{1,1} & y_{1,2} \\ y_{2,1} & y_{2,2} \end{bmatrix} = \begin{bmatrix} x_{1,1}-\rho y_{1,1} & x_{1,2}-\rho y_{1,2} \\ x_{2,1}-\rho y_{2,1} & x_{2,2}-\rho y_{2,2} \end{bmatrix}.$$

Though an example 2×2 data block was used to illustrate the calculation of the projection factor ρ and a residual block vector e 330, the above example can be extended to any sized data block.

Figure 4A:
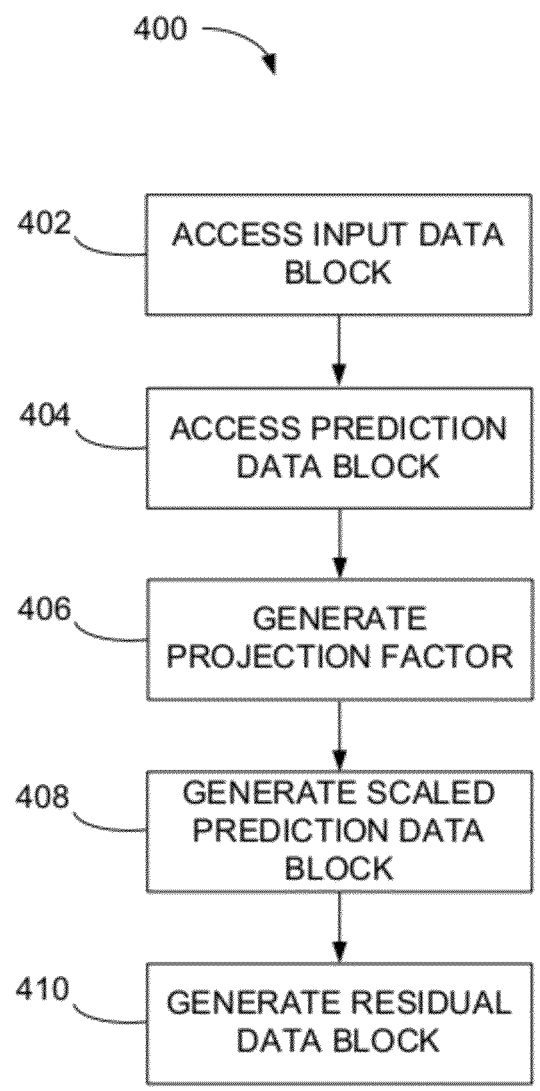
FIG. 4A is a flow chart showing aspects of an example process 400 for encoding image data.

FIG. 4A shows a flowchart for an example encoding procedure 400 for encoding image data. The procedure 400 may be implemented, for example, as part of a procedure performed by an encoder (e.g., encoder 200 or another type of encoder). The procedure 400 may include additional or different operations, and the operations may be performed in the order shown or in a different order. In some instances, one or more of the operations can be repeated or iterated, for example, for a specified number of iterations or until a terminating condition is reached.

The example procedure 400 includes accessing (402) an input data block, accessing a prediction data block (404) and generating (406) a projection factor based on a projection of the input data block onto the prediction data block. The procedure 400 also includes generating (408) a scaled prediction data block by multiplying the projection factor by the prediction data block. The scaled prediction data block is then used to generate (410) a residual data block based on a difference between the input data block and the scaled prediction data block. In some implementations, as appropriate, one or more individual operations shown in FIG. 4A can be executed as multiple operations. In some implementations, as appropriate, one or more subsets of the operations shown in FIG. 4A can be executed as a single operation. For example, in some instances, one or more values for the scaled predication data block and one or more values for the residual data block can be generated in a single operation.

The accessed input data block in 402 may include a data block that may be represented by a matrix X with the size of n×m, where n and m are integers. The data in the data block may also represent image pixels in a transform domain. The data in the input data block may include image data in a spatial domain. The image pixels may be inputted through a video stream or another source. In some implementations, the input data block can be accessed by obtaining the input data block, generating the input data block, receiving the input data block, or by other operations for accessing information. In some instances, the input data block can be computed based on other inputs.

The accessed prediction data block in 404 can include a data block represented by a matrix Y with the size of n×m, where n and m are integers. The data in the prediction data block may also represent image pixels in a transform domain. The data in the prediction data block may include image data in a spatial domain. The data in the prediction data block may represent data based on reconstruction of a block that was already encoded according to the encoding order. The prediction data block may also come from a different frame or picture (through "inter prediction") or the same frame or picture (through "intra prediction"). In some implementations, the prediction data block can be accessed by obtaining the prediction data block, generating the prediction data block, receiving the prediction data block, or by other operations for accessing information. In some instances, the prediction data block can be computed based on other inputs.

The generated projection factor in 406 may be based on a projection of the input data block onto the prediction data block, so that the projection factor $$\rho = \frac{<X, Y>}{<Y, Y>},$$

where $\rho$ is the projection factor, X is the input data block and Y is the prediction data block. The projection factor may be a scalar quantity. The projection factor may also be a quantized and entropy coded, with the reconstructed inverse quantization of the projection factor represented by $\rho'$. In some instances, use of $\rho'$ may provide more efficient encoding, for example, when the projection factor is a real number and in other circumstances.

A syntax element proj_factor can correspond to the projection factor $\rho$ or $\rho'$. The syntax element proj_factor may be coded, for example, using context-adaptive variable-length coding (CAVLC), context-adaptive binary arithmetic coding (CABAC), or another technique. An example parsing technique for proj_factor is as follows. Let proj_factor_minus1=proj_factor−1; parse the sign of proj_factor_minus1; parse the absolute value of proj_factor_minus1 (e.g., encoded by using an exp-golomb code or another coding technique for non-negative integers); and calculate proj_factor=proj_factor_minus1+1. Additional or different parsing techniques may be used.

In some implementations, each prediction data block value is scaled by proj_factor before adding the prediction data block value to the corresponding decoded residual block value. For example, assume proj_factor specifies how the prediction samples associated with the residual samples from a transform unit are scaled. As a result, for an (nS)×(nS) array predSamples, an (nS)×(nS) array resSamples, and a proj_factor, the output (nS)×(nS) array recSamples may be obtained by the operations represented by the following pseudo-code:

```
for (x=0; x < nS; x++)
    for (y=0; y < nS; y++)
        recSamples[x, y] = Clip(resSamples[x, y] +
            proj_factor*predSamples[x, y]),
``` where Clip is specified by $Clip1_Y$ for luma and $Clip1_C$ for chroma. For example, the clipping functions can be standardized clipping functions of a video compression standard (e.g., the H.264 video compression standard, etc.). In some examples, the following clipping functions are used:

$$Clip1_Y(x) = Clip3(0, (1 << BitDepth_Y) - 1, x)$$

$$Clip1_C(x) = Clip3(0, (1 << BitDepth_C) - 1, x))$$

$$Clip3(x, y, z) = \begin{cases} x; & z < x \\ y; & z > y \\ z; & \text{otherwise.} \end{cases}$$

In the expressions above, $BitDepth_Y$ and $BitDepth_C$ denote the bit depth of the luma and chroma components of the picture, respectively.

In some cases, each value recSamples[x, y] can be generated in a single operation, for example, by summing corresponding values of resSamples[x, y] and proj_factor*predSamples[x, y]. In some implementations, intermediate output values for proj_factor*predSamples[x, y] can be generated by a first operation, and then the intermediate output values can be summed with corresponding values of resSamples[x, y] in a subsequent operation to generate recSamples[x, y]. The calculations may be executed by additional or different techniques.

The projection factor $\rho$ can be quantized, entropy encoded, or both, according to any suitable technique, as appropriate in various implementations. An example technique for quantizing and entropy encoding the projection factor $\rho$ is provided as follows. First, a precision for representation of the projection factor $\rho$ is derived from the prediction data block Y. The precision can be denoted, for example, as uiPrecision. Next, the projection factor $\rho$ is quantized by discarding the fractional digits beyond the precision specified by uiPrecision. For example, the quantized projection factor can be derived according to the function $$iRho = \text{round}(abs(\rho-1)*(1 << \text{uiPrecision}))*\text{sign}(\rho-1),$$

where iRho denotes the fixed-point representation the projection factor $\rho$ and sign(a) denotes the sign of a real number a. Next, the fixed-point representation iRho can be entropy coded.

In some implementations, the precision (e.g., uiPrecision above) can be determined based on the mean absolute value of the prediction data block Y, the maximum absolute value of the prediction data block Y, or other information. For instance, in the example above where $Y=[y_{1,1}, y_{1,2}; y_{2,1}, y_{2,2}]$, uiPrecision can be derived by the equation $$uiPrecision = \text{floor}\left(\log_2 \frac{|y_{1,1}| + |y_{1,2}| + |y_{2,1}| + |y_{2,2}|}{4}\right).$$

In some implementations, the entropy coder can use variable length coding, binary arithmetic coding, variable-to-variable length coding, or another coding technique coupled with an appropriated context model.

The projection factor ρ' can be reconstructed by de-quantization, entropy decoding, or both, by a decoder according to any suitable technique, as appropriate in various implementations. In some implementations, to decode the data, ρ' can be reconstructed as follows. First, the precision of representation uiPrecision can be determined from the prediction data block Y or other information, as appropriate. Next, iRho can be entropy decoded based on an appropriate coding technique, such as, for example, context-dependent variable length coding, context-dependent arithmetic coding, context-dependent variable-to-variable length coding, or another coding technique. Next, ρ' can be reconstructed, for example, based on the following equation:

$$\rho' = 1 + \text{sign}(iRHo) * \left( \frac{\text{abs}(iRho)}{1 << uiPrecision} \right).$$

The generated scaled prediction data block in 408 may be achieved by multiplying the projection factor by the prediction data block to form the scaled prediction data block of ρY. Alternatively, the scaled prediction data block may be achieved by multiplying the reconstructed projection factor by the prediction data block to form the scaled prediction data block of ρ'Y.

The generated residual data block in 410 may be represented by relationship e=X−ρY, where e represents the residual data block, where X is the input data block, Y is the prediction data block and ρ is the projection factor. Alternatively, the residual data block may be represented by the relationship, e=X−ρ'Y, where e represents the residual data block, where X is the input data block, Y is the prediction data block and ρ' is the reconstructed projection factor. The data in the residual data block may also include image data in a transform domain. The data in the residual data block may also include image data in a spatial domain.

Figure 4B:
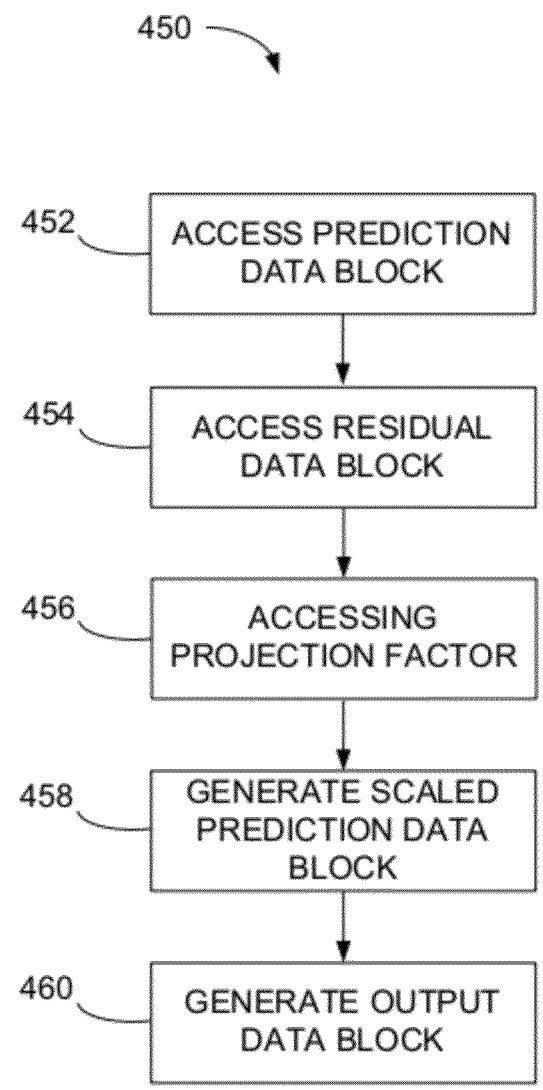
FIG. 4B is a flow chart showing aspects of an example technique for decoding image data.

FIG. 4B shows a flowchart for an example decoding procedure 450 for decoding image data. The procedure 450 may be implemented, for example, as part of a procedure performed by a decoder (e.g., decoder 250 or another type of decoder). The procedure 450 may include additional or different operations, and the operations may be performed in the order shown or in a different order. In some instances, one or more of the operations can be repeated or iterated, for example, for a specified number of iterations or until a terminating condition is reached.

The example procedure 450 includes accessing a prediction data block (452), accessing a residual data block (454) and accessing a projection factor (456) associated with the residual data block. The procedure 450 also includes generating (458) a scaled prediction data block by multiplying the projection factor by the prediction data block. The scaled prediction data block is then used to generate (460) an output data block by summing the residual data block and the scaled prediction data block. In some implementations, as appropriate, one or more individual operations shown in FIG. 4B can be executed as multiple operations. In some implementations, as appropriate, one or more subsets of the operations shown in FIG. 4B can be executed as a single operation. For example, in some instances, one or more values for the scaled predication data block and one or more values for the output data block can be generated in a single operation or command.

The accessed prediction data block in 452 can include a data block represented by a matrix Y with the size of n×m, where n and m are integers. The data in the prediction data block may represent image pixels in a transform domain. The data in the prediction data block may include image data in a spatial domain. The data in the prediction data block may represent data based on reconstruction of a block that was already decoded according to the decoding order. The prediction data block may also come from a different frame or the same frame. In some implementations, the prediction data block can be accessed by obtaining the prediction data block, generating the prediction data block, receiving the prediction data block, or by other operations for accessing information. In some instances, the prediction data block can be computed based on other inputs.

The accessed residual data block in 454 can include a data block represented by a matrix ê with the size n×m, where n and m are integers. The data in the residual data block may include image data in a transform domain. The data in the residual data block may include image data in a spatial domain. In some implementations, the residual data block can be accessed by obtaining the residual data block, generating the residual data block, receiving the residual data block, or by other operations for accessing information. In some instances, the residual data block can be computed based on other inputs.

The accessed projection factor in 456 can include a scalar quantity. In some implementations, the projection factor can be accessed by obtaining the projection factor, generating the projection factor, receiving the projection factor, or by other operations for accessing information. In some instances, the projection factor can be computed based on other inputs.

The generated scaled prediction data block in 458 may be achieved by multiplying the decoded projection factor by the prediction data block to form the scaled prediction data block of ρY. Alternatively, The generated scaled prediction data block in 458 may be achieved by multiplying the decoded projection factor by the prediction data block to form the scaled prediction data block of ρ'Y.

The generated output data block in 460 may be represented by a matrix X with the size of n×m, where n and m are integers. The generated residual data block in 410 may be represented by relationship, X̂=ê+ρY, where ê represents the residual data block, where X is the input data block, Y is the prediction data block and ρ is the projection factor. Alternatively, the generated residual data block in 410 may be represented by relationship, X̂=ê+ρ'Y, where ê represents the residual data block, where X̂ is the reconstructed input data block, Y is the prediction data block and ρ' is the reconstructed projection factor. The output data block may be used to generate an output image.

An example technique for this operation is represented through the following. For each transform unit, its prediction can be scaled by the proj_factor before adding it to the decoded residual block. Thus, in some instances, the reconstructed pixel at position (x, y) may be generated by one or more operations represented by the following pseudo-code:

recSamples[x, y]=Clip(resSamples[x, y]+proj_factor*predSamples[x, y]).

As such, all elements in the (nS)×(nS) array predSamples can be scaled by a factor specified by the proj_factor associated with the (nS)×(nS) array resSamples.

In some implementation, DC and AC components of the prediction block Y are separated. For example, $DC_x$ and $DC_y$ may denote the DC values of the input block X and the prediction block Y, respectively. The projection factor ρ for the AC components of Y may be derived based on the equation $$\rho = \frac{<X, Y> - DC_x * DC_y}{<Y, Y> - DC_y * DC_y}.$$

In this example, the residual block can be derived based on the equation e=X−ρ'(Y−$DC_y$)−$DC_y$, where ρ' is the reconstructed projection factor, and $\hat{X}=\hat{e}+\rho'(Y-DC_y)+DC_y$. In some implementations, the input data block X can be scaled (e.g., instead of scaling the prediction block Y). In such instances, the residual block in such instances can be derived, for example, based on the equation $$e = \frac{1}{\rho'}X - Y$$

and $\hat{X}=\rho'(\hat{e}+Y)$.

Accordingly, an example technique for this operation is represented as follows. For each transform unit, the reconstructed pixel at position (x, y) may be generated by one or more operations represented by the following pseudo-code:

recSamples[x, y] = Clip(resSamples[x, y] + proj__ factor*predSamples[x, y] + (1-proj__factor)*dcPredSamples), where dePredSamples denotes the DC value of predSamples associated with the transform unit.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some aspects, a prediction data block, a residual data block, and a projection factor associated with the residual data block are accessed. A scaled prediction data block is generated by multiplying the projection factor by the prediction data block. An output data block is generated by summing the residual data block and the scaled prediction data block Implementations of these and other aspects may include one or more of the following features. The residual data block represents a first block of pixels in a transform domain, and the prediction data block represents a second block of pixels in the transform domain. The residual data block represents a first block of pixels in a spatial domain, and the prediction data block represents a second block of pixels in the spatial domain. Entropy-coded data are received over a data network. Entropy-decoded data are generated based on the entropy-coded data. The residual data block and the projection factor are based on the entropy-decoded data. The entropy-decoded data are de-quantized. The residual data block and the projection factor are based on the de-quantized entropy-decoded data. An output image is generated based on the output data block.

Additionally or alternatively, implementations of these and other aspects may include one or more of the following features. The residual data block is a first data block $\hat{e}$, the prediction data block is a second data block Y, and the output data block is a third data block X. The projection factor is a scalar quantity $\rho$. The scaled prediction block is generated by calculating $\rho Y$. The output data block is generated by calculating $X=\hat{e}+\rho Y$. The first data block $\hat{e}$, the second data block Y, and the third data block X each represent image data in a transform domain. The first data block $\hat{e}$, the second data block Y, and the third data block X each represent image data in a spatial domain.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable storage medium storing instructions for decoding image data, the instructions operable when executed by data processing apparatus to perform operations comprising:
   accessing a prediction data block including prediction data block values;
   accessing a residual data block including residual data block values;
   accessing a quantized projection factor associated with the residual data block;
   de-quantizing the quantized projection factor;
   generating scaled prediction data block values by multiplying the de-quantized projection factor by the prediction data block values; and
   generating output data block values by summing corresponding residual data block values and scaled prediction data block values.

2. The computer-readable storage medium of claim 1, wherein accessing the residual data block comprises accessing data representing a first plurality of pixels in a transform domain, and accessing the prediction data block comprises accessing data representing a second plurality of pixels in the transform domain.

3. The computer-readable storage medium of claim 2, wherein the residual data block comprises a first data block $\hat{e}$, the prediction data block comprises a second data block Y, a third data block X includes the output data block values, the de-quantized projection factor comprises a scalar quantity $\rho$, generating the scaled prediction data block values comprises calculating $\rho Y$, and generating the output data block values comprises calculating $X=\hat{e}+\rho Y$.

4. The computer-readable storage medium of claim 3, wherein the first data block $\hat{e}$, the second data block Y, and the third data block X each comprise image data in a transform domain.

5. The computer-readable storage medium of claim 3, wherein the first data block $\hat{e}$, the second data block Y, and the third data block X each comprise image data in a spatial domain.

6. The computer-readable storage medium of claim 1, the operations further comprising:
   receiving entropy-coded data over a data network; and
   generating entropy-decoded data based on the entropy-coded data, wherein the residual data block and the de-quantized projection factor are based on the entropy-decoded data.

7. The computer-readable storage medium of claim 6, the operations further comprising de-quantizing the entropy-decoded data, wherein the residual data block and the de-quantized projection factor are each based on the de-quantized entropy-decoded data.

8. The computer-readable storage medium of claim 1, the operations further comprising generating an output image based on the output data block values.

9. A method for decoding image data, the method comprising:
   accessing a prediction data block including prediction data block values;
   accessing a residual data block including residual data block values;
   accessing a quantized projection factor associated with the residual data block;
   de-quantizing the quantized projection factor;
   generating, by one or more computers, scaled prediction data block values by multiplying the de-quantized projection factor by the prediction data block values; and generating, by one or more computers, output data block values by summing corresponding residual data block values and scaled prediction data block values.

10. The method of claim 9, wherein the residual data block comprises a first data block ê, the prediction data block comprises a second data block Y, a third data block X includes the output data block values, the de-quantized projection factor comprises a scalar quantity $\rho$, generating the scaled prediction data block values comprises calculating $\rho Y$, and generating the output data block values comprises calculating $X=\hat{e}+\rho Y$.

11. The method of claim 10, wherein the first data block ê, the second data block Y, and the third data block X each comprise image data in a transform domain.

12. The method of claim 10, wherein the first data block ê, the second data block Y, and the third data block X each comprise image data in a spatial domain.

13. The method of claim 9, further comprising:
receiving entropy-coded data over a data network; and
generating entropy-decoded data based on the entropy-coded data, wherein the residual data block and the de-quantized projection factor are each based on the entropy-decoded data.

14. The method of claim 13, further comprising de-quantizing the entropy-decoded data, wherein the residual data block and the de-quantized projection factor are each based on the de-quantized entropy-decoded data.

15. The method of claim 9, further comprising generating an output image based on the output data block values.

16. A system for decoding image data, the system comprising:
a memory operable to store a prediction data block including prediction data block values, a residual data block including residual data block values, and a quantized projection factor associated with the residual data block; and
data processing apparatus operable to perform operations comprising:
de-quantizing the quantized projection factor;
generating scaled prediction data block values by multiplying the de-quantized projection factor by the prediction data block values; and
generating output data block values based on a sum of corresponding residual data block values and scaled prediction data block values.

17. The system of claim 16, wherein the residual data block comprises a first data block ê, the prediction data block comprises a second data block Y, a third data block X includes the output data block values, the de-quantized projection factor comprises a scalar quantity $\rho$, generating the scaled prediction data block values comprises calculating $\rho Y$, and generating the output data block values comprises calculating $X=\hat{e}+\rho Y$.

18. The system of claim 16, further comprising a communication interface operable to receive entropy-coded data over a data network.

19. The system of claim 18, the operations further comprising generating entropy-decoded data based on the entropy-coded data, wherein the residual data block and the de-quantized projection factor are each based on the entropy-decoded data.

20. The system of claim 19, the operations further comprising de-quantizing the entropy-decoded data, wherein the residual data block and the de-quantized projection factor are each based on the de-quantized entropy-decoded data.

21. The system of claim 16, the operations further comprising generating an output image based on the output data block values.

22. The system of claim 21, further comprising a display device operable to display the output image.

23. The method of claim 9, further comprising determining a precision associated with the quantized projection factor based on the prediction data block.

24. The method of claim 9, wherein the quantized projection factor includes:
a DC (direct current) projection factor for DC components of the prediction data block; and
an AC (alternating current) projection factor for AC components of the prediction data block.

* * * * *